(12) United States Patent
Messana et al.

(10) Patent No.: US 11,297,806 B2
(45) Date of Patent: Apr. 12, 2022

(54) LIGHTING CONTROLLER FOR SEA LICE DETECTION

(71) Applicant: X Development LLC, Mountain View, CA (US)

(72) Inventors: Matthew Messana, Sunnyvale, CA (US); Christopher Thornton, Mountain View, CA (US); Grace Calvert Young, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 16/743,023

(22) Filed: Jan. 15, 2020

(65) Prior Publication Data
US 2021/0212298 A1 Jul. 15, 2021

(51) Int. Cl.
*A01K 61/13* (2017.01)
*A01K 63/06* (2006.01)
*H04N 5/225* (2006.01)

(52) U.S. Cl.
CPC .............. *A01K 61/13* (2017.01); *A01K 63/06* (2013.01); *H04N 5/2256* (2013.01)

(58) Field of Classification Search
CPC ........ A01K 61/13; A01K 61/90; A01K 61/95; A01K 63/06
See application file for complete search history.

(56) References Cited

U.S. PATENT DOCUMENTS

| | | | |
|---|---|---|---|
| 10,863,727 B2* | 12/2020 | Jans | A01K 61/13 |
| 2013/0273599 A1* | 10/2013 | Robitaille | A01K 63/06 |
| | | | 435/39 |
| 2015/0136037 A1* | 5/2015 | Boonekamp | A01K 61/60 |
| | | | 119/226 |

(Continued)

FOREIGN PATENT DOCUMENTS

| | | |
|---|---|---|
| EP | 2962556 | 1/2016 |
| GB | 2539495 | 12/2016 |

(Continued)

OTHER PUBLICATIONS

PCT International Search Report and Written Opinion in International Appln. No. PCT/US2021/023104, dated Jun. 18, 2021, 13 pages.

(Continued)

*Primary Examiner* — Christopher D Hutchens
*Assistant Examiner* — Kevin M Dennis
(74) *Attorney, Agent, or Firm* — Fish & Richardson P.C.

(57) ABSTRACT

Methods, systems, and apparatus, including computer programs encoded on computer-storage media, for a lighting controller for sea lice detection. In some implementations, a pulse of red light and a pulse of blue light can be timed with the exposure of a camera to capture multiple images of a fish or group of fishes in both red and blue light. By using the captured images with different color light, computers can detect features on the body of a fish including sea lice, skin lesions, shortened operculum or other physical deformities and skin features. Detection results can aid in mitigation (Continued)

techniques or be stored for analytics. For example, sea lice detection results can inform targeted treatments comprised of lasers, fluids, or mechanical devices such as a brush or suction.

20 Claims, 9 Drawing Sheets

(56) References Cited

U.S. PATENT DOCUMENTS

| | | | |
|---|---|---|---|
| 2017/0172114 A1 | 6/2017 | Halse | |
| 2018/0000055 A1* | 1/2018 | Tanase | A01K 61/00 |
| 2018/0027637 A1* | 1/2018 | Kurt | H05B 45/20 |
| | | | 315/159 |
| 2019/0363791 A1* | 11/2019 | Teo | H04B 10/116 |
| 2020/0113158 A1* | 4/2020 | Rishi | A01K 61/10 |
| 2020/0288679 A1* | 9/2020 | Howe | A01K 61/13 |
| 2020/0288680 A1* | 9/2020 | Howe | A01K 61/60 |
| 2021/0080715 A1* | 3/2021 | Saxena | A01K 63/06 |
| 2021/0142052 A1* | 5/2021 | James | G06K 9/6256 |

FOREIGN PATENT DOCUMENTS

| | | |
|---|---|---|
| JP | 2001190488 | 7/2001 |
| WO | WO2019/121887 | 6/2019 |
| WO | WO 2019/121900 | 6/2019 |
| WO | WO2019/245722 | 12/2019 |
| WO | WO-2020180188 A1 * 9/2020 | G01N 21/21 |

OTHER PUBLICATIONS

PCT International Search Report and Written Opinion in International Appln. No. PCT/US2020/066800, dated Mar. 11, 2021, 15 pages.
Malov et al., "A spatio-temporal recurrent network for salmon feeding action recognition from underwater videos in aquaculture," Computers and Electronics in Agriculture, Nov. 12, 2019, 9 pages.
Odey, "AquaMesh—Design and Implementation of Smart Wireless Mesh Sensor Networks for Aquaculture," American Journal of Networks and Communications, Jul. 2013, 8 pages.
Petrov et al., "Overview of the application of computer vision technology in fish farming." E3S Web of Conferences. 2020, 175:02015.
Saberloon et al., "Application of Machine Vision Systems in Aquaculture with Emphasis on Fish: State-of-the-Art and Key Issues," Reviews in Aquaculture, Dec. 2017, 9:369-387.
towardsdatascience.com [online], "Analyzing Applications of Deep Learning in Aquaculture," Jan. 2021, retrieved on Aug. 11, 2021, retrieved from URL<https://towardsdatascience.com/analyzing-applications-of-deep-learning-in-aquaculture-7a273399553/>, 12 pages.
Wang, "Robust tracking of fish schools using CNN for head identification," Multimedia Tools and Applications, Nov. 2017, 20 pages.

* cited by examiner

LIGHTING CONTROLLER FOR SEA LICE DETECTION

TECHNICAL FIELD

This specification generally describes lighting controllers, particularly those used for aquaculture.

BACKGROUND

Sea lice feed on the mucus epidermal tissue and blood of host marine fish. Sea lice infestations can be a major problem in fish farming, since heavy infections can lead to deep lesions, particularly on the head region. Sea lice infestations can kill or render salmon unsuitable for market.

SUMMARY

By capturing a detailed image of a fish, image analysis can be performed to detect sea lice or other skin features, including lesions, on the fish. Detection can be automatic and can inform various techniques of mitigation. For sea lice detection, mitigation can include methods of delousing. To capture an image, illuminator lights with specific frequencies are controlled by a lighting controller to coincide with camera exposures. The specific frequency of light is chosen for properties likely to aid in the detection of sea lice as well as skin lesions, shortened operculum or other physical deformities and skin features. Illuminator light controllers can use pulse patterns to illuminate a fish with specific frequency light.

Advantageous implementations can include one or more of the following features. For example, red and blue light-emitting diodes (LEDs) alternately cast light on a fish within the field of view of one or more cameras. A camera can transfer images to a computer which performs visual analysis to detect attached sea lice. The different color light can highlight different features of interest along with improving clarity for sea lice detection. By combining images or analyzing separate images, analysis can inform sea lice detection.

The wavelength of a beam of light can change depending on the medium in which the beam propagates. The visible spectrum is continuous. Wavelength ranges for given colors within the continuous spectrum are approximate but wavelength or frequency can be used to clearly differentiate two or more colors.

In some implementations, the detection information for specific fish can be stored. The stored data can be used for lice mitigation, other diagnoses, or in producing analytics. For example, a fish can be detected by a system employing image analysis to have a certain quantity of sea lice attached to the right-side gill. This information can be passed to an automatic delouse, which can remove the sea lice. In addition, this information can be stored on a server to inform population analytics.

In some implementations, the lighting controller can use pairs of light pulses. For example, the lighting controller can use a red light and a blue light to illuminate a fish. The red light and the blue light can alternate illuminating the fish such that, at some point, the fish is illuminated by the red light and at another point the fish is illuminated by the blue light. Images can be captured of the fish while it is being illuminated by the red light. Images can also be captured of the fish while it is being illuminated by the blue light. Image processing can combine an image captured with red light illumination and an image captured with blue light illumination to determine if the fish has a certain condition. Conditions can include a sea lice infection, a lesion on the body of the fish, or a physical deformity such as a shortened operculum.

The lighting controller can be used in any area with fish. For example, the lighting controller can be used within a fish pen. The lighting controller can also be used within a fish run.

In some implementations, the lighting controller can include a blue light with a specific frequency range. For example, the lighting controller can include a blue light that can produce peak power within a wavelength range of 450 nanometers to 480 nanometers.

In some implementations, the lighting controller can have a certain frequency at which illuminators alternate. For example, the lighting controller can use pairs of light pulses which alternate on and off more than sixty times a second. The specific frequency can be chosen to ensure that a fish does not perceive the illuminators alternating. The specific frequency can be chosen to ensure that a fish perceives the illuminators as steady sources of light.

In some implementations, camera exposures can be timed to coincide with periods of time in which a fish is illuminated. For example, a camera can open for exposures for a portion of time between when an illuminator is on and illuminating a fish and when the illuminator is off and not illuminating the fish. In some implementations, a camera can open for exposures for a portion of time between when an illuminator is off and not illuminating a fish and when the illuminator is on and illuminating the fish.

In some implementations, the lighting controller can activate illuminators without any overlap. For example, the lighting controller can illuminate a fish with a blue light for a period of time. The lighting controller can then stop illuminating the fish with the blue light. The lighting controller can then illuminate a fish with a red light for a period of time.

In some implementations, machine learning can be used to inform elements of the detection process. For example, the lighting controller can vary the time of camera exposure or illumination depending on current background lighting levels or the type of fish detected in the field of view. In some cases, the lighting controller or image analysis process can use positive or negative detection results to inform machine learning. For example, the lighting controller can use a learning data set of known sea lice infected fish and adjust illumination frequency, exposure lengths, or other parameter to produce a greater number of accurate detections or fewer inaccurate detections.

In some implementations, an image buffer can be used to help aid in image capture. For example, a camera can capture an exposure for an amount of time and save a resulting image to an image buffer. The camera can continue to save images to the image buffer until the image buffer is full. Images saved to the image buffer can be transferred to another device or computer. In some cases, an image buffer can be used to reduce the amount of time in between consecutive image captures. Reducing the amount of time in between consecutive image captures can be advantageous when combining two or more images (e.g., an image captured of a fish illuminated with a red light and an image captured of the fish illuminated with a blue light).

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
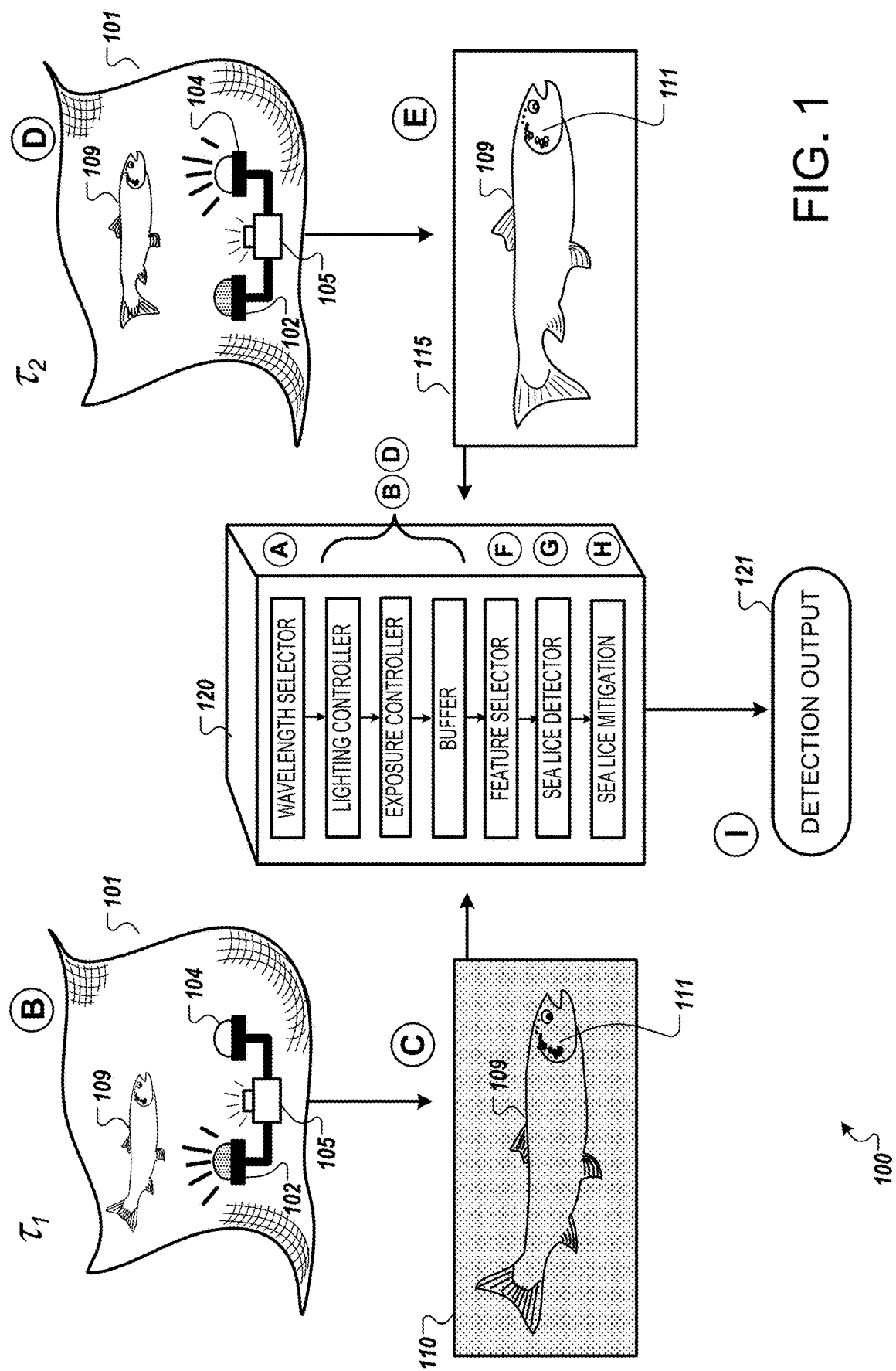
FIG. 1 is a diagram showing an example of a system for sea lice detection.

FIG. 1 is a diagram showing an example of a system 100 for sea lice detection. The system 100 is comprised of a fish pen 101, a control unit 120, two primary illuminators 102 and 104, a camera 105, and the fish 109. The fish pen 101 is formed with netting, e.g., rope, nylon, or silk. Illuminators can be controlled with signals from a lighting controller. In some implementations, the lighting controller can be connected to the control unit 120. The fish 109 can be a member of a population of fish located with the fish pen 101. In this example, the fish is a salmon with sea lice on its body.

In some implementations, the detection of sea lice can include specific species of sea lice. For example, several species of ectoparasitic copepods of the genera *Lepeophtheirus* and *Caligus*. The type of fish being analyzed can affect the process of sea lice detection. For example, upon detection of a salmon, a system can adapt a system of detection for the detection of *Lepeophtheirus salmonis*—a species of sea lice which can be especially problematic for salmon. In some implementations, a detection of a specific species of sea lice can be separated from other sea lice detections. For example, a detection of *Lepeophtheirus salmonis* can be separated from sea lice detections of *Caligus curtis* and *Lepeophtheirus hippoglossi*.

In FIG. 1, the fish pen 101 is shown at initial time $\tau_1$ and later time $\tau_2$. The status (e.g., on/off) as well as the position of the contents of the fish pen 101 can change from time $\tau_1$ to $\tau_2$.

The times $\tau_1$ and $\tau_2$ correspond to the time at which a first image is captured ($\tau_1$) and the time at which a second image is captured ($\tau_2$). In some implementations, different exposure techniques can enable sea lice detection with only a single image capture. The various exposure techniques as well as exposure patterns are discussed below.

The two primary illuminators 102 and 104 are LEDs transmitting light within specific frequency ranges. Illuminator 102 transmits light within the wavelength range of 440 nm to 485 nm and appears blue. The blue light region is distinct from the cyan light region in that the blue light region stretches from 450 nm wavelength up to 485 nm wavelength, while the wavelength of cyan light starts at 485 nm wavelength and increases to 500 nm. Blue light can have peak power between 450 and 485 nm wavelengths while cyan light can have peak power between 485 nm and 500 nm wavelengths. Furthermore, the light of a blue LED used in the lighting controller can be concentrated towards the lower wavelengths of the blue light region creating a separation of blue light to cyan light. The separation can be thousands of gigahertz or greater which equates to roughly ten percent of the entire visible spectrum. A greater separation between red light (e.g., 625 nm to 780 nm wavelength) and blue light (e.g., 450 nm to 485 nm wavelength) can result in greater accuracy in sea lice detection as well as detections of skin lesions, shortened operculum or other physical deformities and skin features.

Illuminator 104 transmits light within the wavelength range of 620 nm to 750 nm and appears red. Frequency can be tuned to maximize frequency space separation while retaining visible light for camera image capture and minimizing environmental disruptions (e.g., light absorption, light scattering).

The camera 105 captures visible light images. The exposures of camera 105 can be timed with illumination of any other illuminators in the fish pen 101 (e.g., illuminator 102, illuminator 104, additional illuminators). The exposure of camera 105 and illumination of any illuminator can be controlled by the control unit 120.

In some implementations, secondary illuminators can be used. Secondary illuminators can provide additional light for exposures of camera 105. For example, secondary illuminators can be used to brighten the image of the fish. This can be useful in situations where surface light is minimal. Secondary illuminators can also enable the ability to control the ambient light of an image capture which can be useful in controlling for varying water conditions or location conditions.

In some implementations, more or fewer illuminators can be used. For example, in some situations, secondary illuminators may not be required. These situations may include applications where background light is sufficient or does not pose challenges for sea lice detection. Less illuminators can also be used by installing custom image filters to capture an image or images.

Stage A in FIG. 1 shows a particular wavelength being selected by the control unit 120. This wavelength can be used by light emitting diodes (LEDs) within the fish pen shown in item 101. The LEDs can be activated to illuminate the fish 109. In some implementations, other forms of light can be used. For example, instead of LEDs, incandescent light bulbs can be used. Other forms of light production may be used for either the primary set or a secondary set of illuminators.

In some implementations, the wavelengths can be set before imaging events take place. For example, an LED can be installed which emits light in the blue visible spectrum of light with wavelengths between 440 nm and 485 nm. Another LED can be installed which emits light in the red visible spectrum of light with wavelengths between 620 nm and 750 nm. In general, it can be advantageous to use dissimilar frequencies, one with longer wavelength (towards infrared) and another with shorter wavelength (towards ultraviolet). Lights reaction in water should be considered and can prevent some frequencies of light from propagating effectively and therefore functioning properly as a primary illuminator.

In some implementations, the frequency of the illumination LEDs can be tuned remotely. For example, revolving LED wheels can be used to pick from a variety of LEDs. LEDs can be chosen based on effectiveness. Criteria can include an ability to produce images likely to result in true positive sea lice detection.

Figure 2:
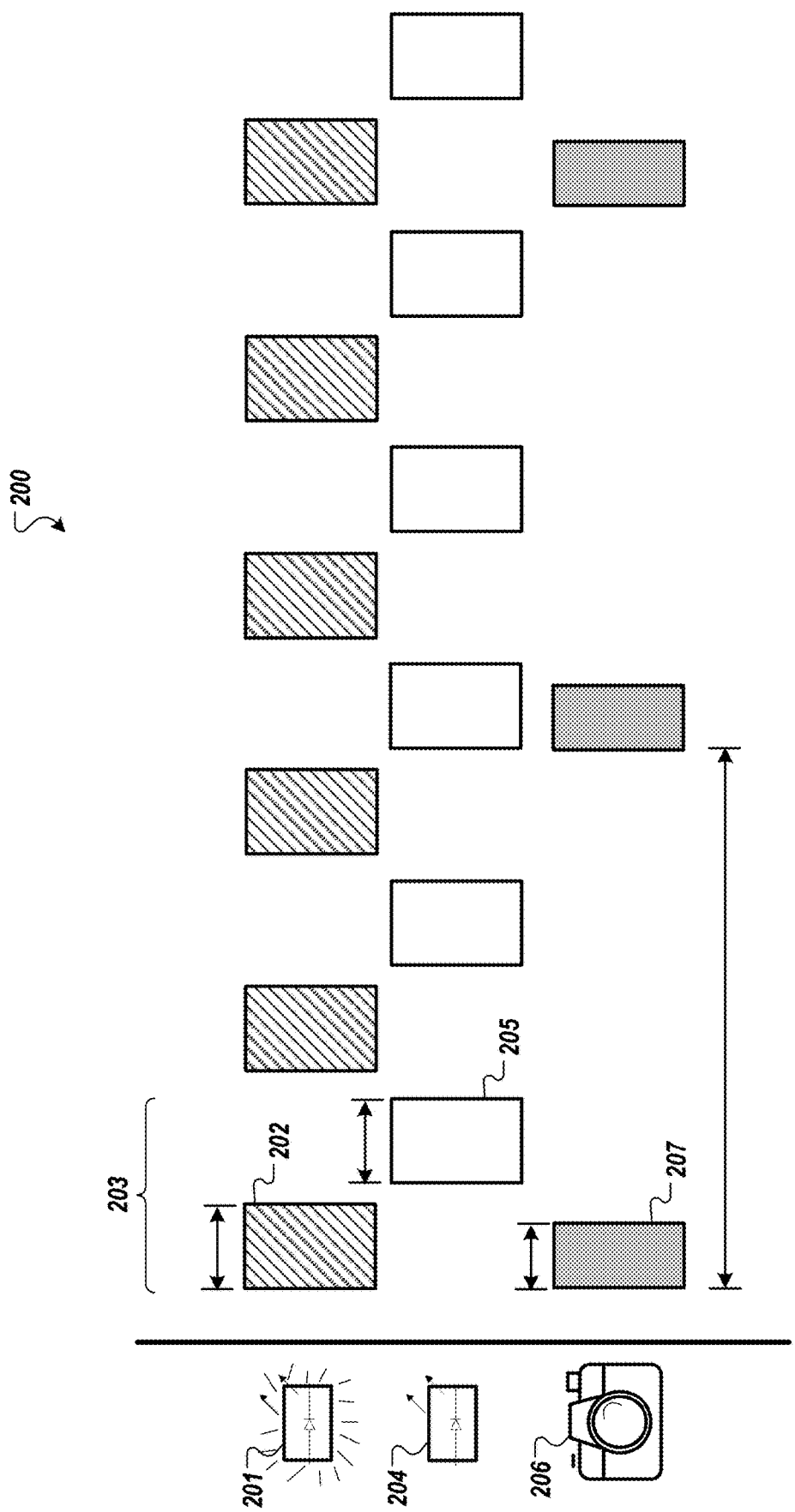
FIG. 2 is a diagram of an exposure pattern.
Figure 3:
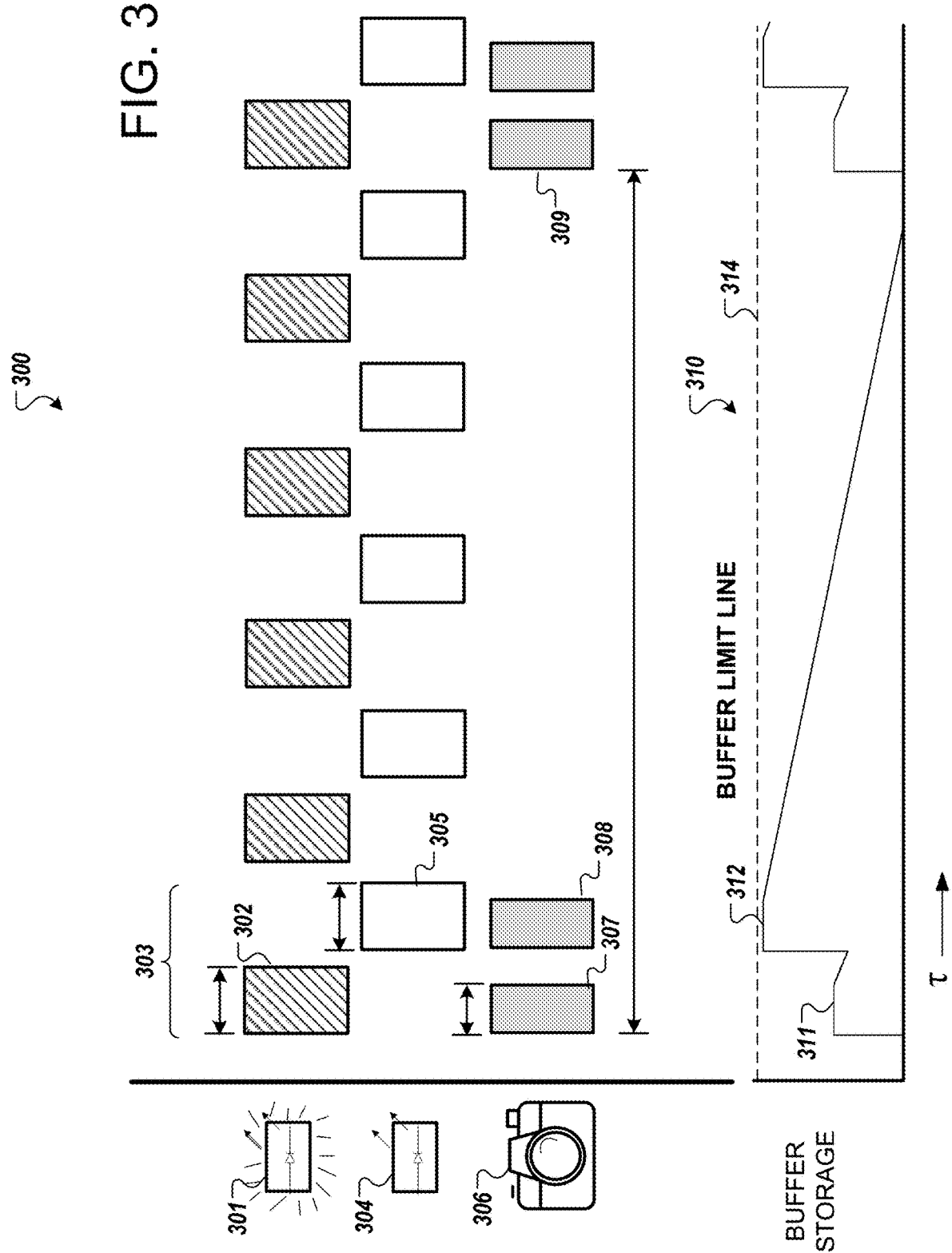
FIG. 3 is a diagram of an alternative exposure pattern.
Figure 4:
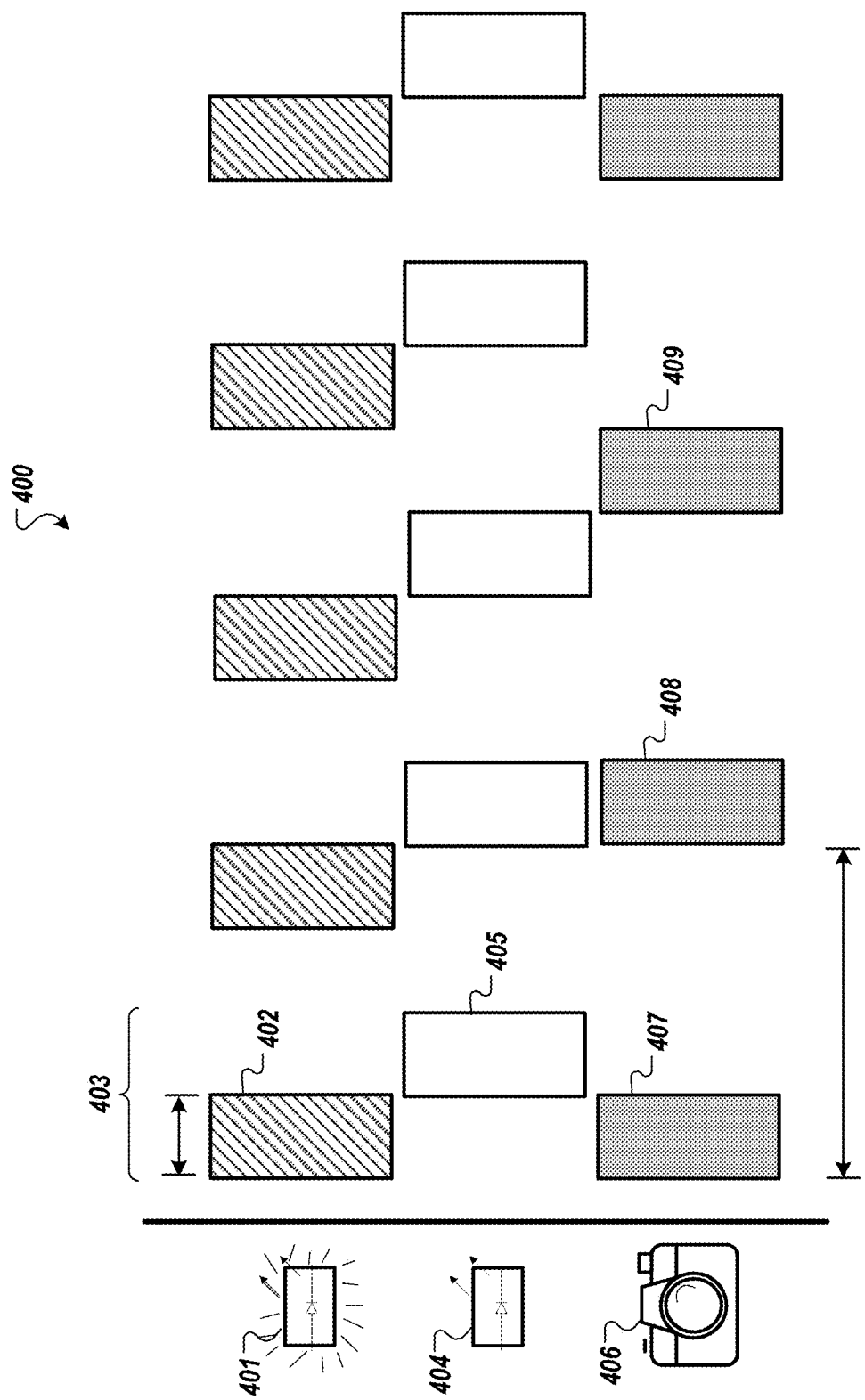
FIG. 4 is a diagram of another alternative exposure pattern.

Stage B in FIG. 1 shows the pen 101 at time $\tau_1$. The fish pen 101 contains the fish 109, the camera 105, and the primary illuminators 102 and 103. In this example, secondary illuminators are not used while the primary illuminators 102 and 103 are used and are set to the colors red and blue, respectively. The illuminators can be controlled by a lighting controller (e.g., control unit 120) connected to the camera 105 or by the camera 105 itself. The camera can time exposures as shown in FIG. 2, FIG. 3, and FIG. 4. The specifics of the different exposure patterns will be discussed later in this application.

At time $\tau_1$, the blue LED illuminator fires and bathes the fish 109 in blue light. The camera 105 opens exposures to coincide with the blue LED illuminator. The camera 105 can open exposures simultaneously with the flash of an illuminator or after the beginning of the flash.

Stage C in FIG. 1 shows an image 110 created by an exposure of camera 105 and the illumination of the blue LED 102. The dot pattern in the image 110 represents the color blue of the illuminator used to capture the image. In the image 110, the fish 109 is shown with sea lice 111 attached near the head.

In some implementations, multiple fish can be detected within an image. For example, the image taken by camera 105 can show multiple fish. The multiple fish can have individual sea lice detections.

Stage D in FIG. 1 shows the pen 101 at time $\tau_2$ temporally separated from the fish pen 101 at time $\tau_1$. The fish 109 has moved from left to right as the second illuminator, the red LED 104, fires. The firing of the illuminator 104 coincides with the exposure of camera 105. At time $\tau_2$, the red LED illuminator 104 fires and bathes the fish 109 in red light. The camera 105 opens exposures to coincide with the red LED illuminator. The camera 105 can open exposures simultaneously with the flash of an illuminator or after the beginning of the flash.

Stage E in FIG. 1 shows an image 115 created by an exposure of camera 105 and the illumination of the red LED 104. In contrast to the primarily blue image 110, the image 115 is primarily red owing to the illumination of the red LED 104. This is represented by the absence of the dots used to represent the blue illumination in the image 110. In the image 115, the fish 109 is shown with sea lice 111 attached.

In some implementations, the exposure of camera 105 need not be simultaneous with illuminators. For example, the blue LED 102 can fire before the camera 105 begins capturing images or after. Images captured by the camera 105 can be selected based on illuminator status during image capture.

Stage F in FIG. 1 involves feature selection. Feature selection can be a form of image analysis performed on images (e.g., image 110, image 115). In some implementations, image 110 and image 115 can be combined. Image analysis can be performed to detect features on the body of the fish 109. The image analysis can be performed by various computational methods including algorithms, neural networks, or linear regressions.

In some implementations, the image analysis may be composed of multiple steps. For example, a rough object identifier may be used to detect the fish 109 within the image 110. A second object identifier may use the output of the first object identifier to locate objects on the fish 109 (e.g., the sea lice 111). The multiple steps can be performed by various computational methods including algorithms, neural networks, or linear regressions.

Stage G in FIG. 1 involves detecting sea lice based on the image analysis performed. In some implementations, the image of the body of the fish can be separated from the background. Other pre-processing methods can prepare stages of image analysis. Sea lice surrounding and overlaying the image of the body can be detected and counted and attributed to a specific fish. Tallies of sea lice can be kept for individual fish, groups of fish, or whole populations. Detected sea lice data can be used by the system to inform further steps either for mitigation or analytics.

Stage H in FIG. 1 shows a possible act related to the detection of sea lice. In some implementations, the act can be a form of sea lice mitigation. Techniques can include focused laser light where provided coordinates from the detected sea lice data can be used to target the lasers. Sea lice mitigation can take place in sync with detection or after detection. Detected sea lice data can be stored for future sea lice mitigation, or for analytics, by other devices within the system. In some implementations, the system 100 can store detected sea lice data and inform human workers to proceed with a sea lice mitigation technique. For example, infected fish can be tagged with a location which workers can use to catch and delouse the fish.

Stage I in FIG. 1 shows the output 121 of the control unit 120. The detection output 121 can include data related to the event of sea lice detection. For example, the detection output 121 can include instructions for sea lice mitigation, data related to the fish 109, or data related to the sea lice 111. For example, the detection output can specify that seven sea lice are on the fish 109 at specific coordinates or attached to specific features of the fish. The output can specify that sea lice mitigation for fish 109 should be conducted by hand. This data can be stored or used within other systems connected to or within system 100.

The system 100 can also be useful in detecting other conditions. For example, skin lesions on a fish can be detected using similar methods and processes. In some implementations, instead, or in addition to, analyzing images illuminated by different frequencies of light for elements denoting sea lice infection, a system can perform other analysis. For example, a system can analyze images illuminated by different frequencies of light for elements denoting skin lesions or physical deformities such as shortened operculum.

FIG. 2 is a diagram of an exposure pattern 200 which can be used by a lighting controller of system 100. The exposure pattern 200 is comprised of a blue LED 201, red LED 204 and a camera 206. The boxes similar to item 202 represent time intervals in which the blue LED 201 is illuminating. The boxes similar to item 205 represent time intervals in which the red LED 204 is illuminating. The boxes similar to item 207 represent time intervals in which the camera 206 is open for exposures. The time interval of the blue LED illumination 202 and the time interval of the red LED illumination 205 can be considered an initial pair of light pulses 203. Succeeding pairs of light pulses may follow the initial pair.

Proceeding within FIG. 2 from left to right shows the progression of exposure pattern from beginning to a later time. In this example, the blue LED 201 can fire for a duration of 5 milliseconds. The camera 206 opens for exposure during this window. The exposure duration can vary but can overlap with the period of illumination from the blue LED 201. An image captured during the illumination of the blue LED 201 can be stored using a computer device connected to the camera 206 or the camera 206 itself.

At the end of the illumination window, the blue LED 201 stops illuminating. After the blue LED has stopped illuminating, the red LED 204 begins illuminating. In some implementations, an overlap between the two LEDs can be used. For example, if the blue LED 201 illuminates from time 0 to time 5 ms, the red LED 204 can fire from time 4 ms to 9 ms. Furthermore, the time intervals of the LEDs illumination need not be identical. For example, the blue LED 201 can illuminate for 5 ms while the red LED 204 illuminates for 10 ms.

In some implementations, a gap between sequential illuminations can be inserted. For example, after the illumination of the blue LED 201 but before the illumination of the red LED 204, the pattern 200 can contain a 1 ms period of non-illumination. In some implementations, periods of non-illumination can be inserted to prevent a subject being illuminated simultaneously by the blue LED 201 and the red LED 204.

After a delay, the camera 206 can start exposures again. In some implementations, this delay can be inserted to transfer an image to a storage device or somewhere within memory. For example, the delay can be 40 ms. Different implementations can use different delay lengths. In this example, the delay corresponds to the time from the beginning of one exposure to the beginning of the next exposure. The next exposure can be of an illumination that has not previously been captured. For example, if the illumination of the blue LED 201 was captured in exposure number one, the illumination of the red LED 204 can be captured in exposure number two. In this example, the time between exposure one and exposure two can be considered a delay.

While the camera is not capturing an exposure, the LEDs 201 and 204 can alternate. This alternating can be advantageous as it can help maintain a more steady illumination level. At a rate of around 100 Hz, for example, alternating at a rate of up to 120 Hz, the alternating LEDs 201 and 204 may appear similar to steady non-flashing lights. Advantageous implementations may include maintaining a higher alternating rate for the light source as steady non-flashing lights are more attractive to some fish than flashing lights.

The exposure pattern 200 can continue for as long as is required. In some implementations, the exposures will end after a subject has left the field of view of camera 206. Multiple images can be combined or processed separately. Single images can also be processed.

In some implementations, the red LED 204 can emit peak power at a specific wavelength. For example, the red LED 204 can emit peak power at a wavelength between 625 nm and 780 nm. In some implementations, the blue LED 201 can emit peak power at a specific wavelength. For example, the blue LED 201 can emit peak power at a wavelength between 450 nm and 485 nm.

FIG. 3 is a diagram of an exposure pattern 300 which can be inserted by a lighting controller of system 100. The exposure pattern 300 is comprised of a blue LED 301, red LED 304 and a camera 306. The boxes similar to item 302 represent time intervals in which the blue LED 301 is illuminating. The boxes similar to item 305 represent time intervals in which the red LED 304 is illuminating. The boxes similar to item 307 represent time intervals in which the camera 306 is open for exposures. The time interval of the blue LED illumination 302 and the time interval of the red LED illumination 305 can be considered an initial pair of light pulses 303. Succeeding pairs of light pulses may follow the initial pair.

Proceeding within FIG. 3 from left to right shows the progression of exposure pattern from beginning to a later time. In this example, the blue LED 301 fires at time zero for a duration of 5 milliseconds. The camera 306 opens for exposure during this window for a duration of 4 milliseconds. An image captured during the illumination of the blue LED 301 can be stored using a computer device connected to the camera 306 or the camera 306 itself.

At the end of the illumination window, the blue LED 301 stops illuminating. After the blue LED has stopped illuminating, the red LED 304 begins illuminating. In some implementations, an overlap between the two LEDs can be implemented. For example, if the blue LED 301 illuminates from time 0 to time 5 ms, the red LED 304 can fire from time 4 ms to 9 ms. Furthermore, the time intervals of the LEDs illumination need not be identical. For example, the blue LED 301 can illuminate for 5 ms while the red LED 304 illuminates for 10 ms.

In some implementations, a gap between sequential illuminations can be inserted. For example, after the illumination of the blue LED 301 but before the illumination of the red LED 304, the pattern 300 can contain a 1 ms period of non-illumination. In some implementations, periods of non-illumination can be inserted to prevent a subject being illuminated simultaneously by the blue LED 301 and the red LED 304.

After initial exposure 307, the camera 306 can start exposures again. In this example, the delay between first and second exposures is shorter than exposure pattern 200. A shorter delay can be accomplished by using a larger buffer to store multiple images captured within exposures. A graph of the buffer is shown in item 310. The buffer graph 310 shows, relative to the horizontal axis of time, the amount of image data held in the image buffer. Item 311 shows the buffer storage increase as the image 307 is captured. Item 312 shows the buffer storage increase again as the image 308 is captured. An image from both exposure 307 and exposure 308 can be stored within the image buffer if the data stored is below a limit like the buffer limit line shown in item 314.

In order to stay within the buffer limit 314, the exposure pattern can delay to give time for the images stored in the buffer to be transferred out of the buffer onto another storage device. Different implementations can use different delay lengths. The delay can be the time between two consecutive groups of exposures. For example, the delay for pattern 300 can be 80 ms as measured from the beginning of exposure 307 to the beginning of exposure 309. This delay may be calibrated to give enough time for the buffer to transfer data. The process of buffer transfer can be seen in graph 310 as a downward slanted line.

In some implementations, different delay lengths as well as number of exposures captured within an exposure group, can vary. For example, instead of two exposures within the first exposure group, four can be implemented. In general, the number of exposures per group before a period of non-exposure depends on the size of the image buffer used. During a period of non-exposure, data can be offloaded from the image buffer. With a large image buffer, more images can be captured with less delay in between consecutive shots.

After a period of non-exposure, the camera 306 can resume exposures. The moment to resume exposures can coincide with buffer storage availability as well as illumination from illuminators (e.g., the blue LED 301, the red LED 304). For example, exposure 307 is timed with illumination from the blue LED 301. Exposure 308 is timed with illumination from the red LED 304. After a period of non-exposure, the camera 306 can resume exposures. The first exposure after a period of non-exposure can be timed with the blue LED 301 or with the red LED 304. In this case, the exposure after a period of non-exposure is timed with the blue LED 301. The exposure 309 after a period of non-exposure can also coincide with the buffer storage availability as shown in graph 310.

While the camera is not exposing, the LEDs 301 and 304 can alternate. This alternating can be advantageous as it can help maintain a more steady illumination level. At a rate of around 100 Hz or higher, the alternating LEDs 301 and 304 may appear similar to steady non-flashing lights which are more attractive to some fish than flashing lights.

The exposure pattern 300 can continue for as long as is required. In some implementations, the exposures will end after a subject has left the field of view of camera 306. Multiple images can be combined or processed separately. Single images can also be processed.

In some implementations, the red LED 304 can emit peak power at a specific wavelength. For example, the red LED 304 can emit peak power at a wavelength between 625 nm and 780 nm. In some implementations, the blue LED 301 can emit peak power at a specific wavelength. For example, the blue LED 301 can emit peak power at a wavelength between 450 nm and 485 nm.

FIG. 4 is a diagram of an exposure pattern 400 which can be implemented by a lighting controller of system 100. The exposure pattern 400 is comprised of a blue LED 401, red LED 404 and a camera 406. The boxes similar to item 402 represent time intervals in which the blue LED 401 is illuminating. The boxes similar to item 405 represent time intervals in which the red LED 404 is illuminating. The boxes similar to item 407 represent time intervals in which the camera 406 is open for exposures. The time interval of the blue LED illumination 402 and the time interval of the red LED illumination 405 can be considered an initial pair of light pulses 403. Succeeding pairs of light pulses may follow the initial pair. In some cases, intervals in which neither the blue LED 401 nor the red LED 404 is illuminated may be inserted between or within a pair or pairs of light pulses.

Proceeding within FIG. 4 from left to right shows the progression of exposure pattern from beginning to a later time. The time of illumination can be set for each light source used in an exposure pattern. For example, in some implementations, the blue LED 401 can fire at time zero for a duration of 5 milliseconds. When the subject is illuminated with a light source, the camera 406 can open for exposure. An image captured during the illumination of the blue LED 401 can be stored using a computer device connected to the camera 406 or the camera 406 itself.

At the end of the illumination window, the blue LED 401 stops illuminating. After the blue LED has stopped illuminating, the red LED 404 begins illuminating. In some implementations, an overlap between the two LEDs can be used. For example, if the blue LED 401 illuminates from time 0 to time 5 ms, the red LED 204 can fire from time 4 ms to 9 ms. Furthermore, the time intervals of the LEDs illumination need not be identical. For example, the blue LED 401 can illuminate for 5 ms while the red LED 404 illuminates for 10 ms. Other durations can also be used.

In some implementations, a gap between sequential illuminations can be inserted. For example, after the illumination of the blue LED 401 but before the illumination of the red LED 404, the pattern 400 can contain a 1 ms period of non-illumination. In some implementations, periods of non-illumination can be inserted to prevent a subject being illuminated simultaneously by the blue LED 401 and the red LED 404.

After a delay, the camera 406 starts exposures again. In some implementations, this delay can be inserted to transfer the image to a storage device or somewhere within memory. For example, the delay can be 40 ms from exposure 407 to exposure 408. Different implementations can use different delay lengths. The delay corresponds to the time difference between two sequential camera exposures. For example, if the blue LED 401 illumination was captured in exposure 407, the red LED 404 illumination can be captured in exposure 408 after a given delay.

After another delay, the camera 406 exposes again shown in item 409. The exposure 409 captures an image while no illuminators are illuminated. In the moments before, the blue LED 401 illuminates, followed by the red LED 404 but the exposure pattern 400 includes a period of non-illumination after the red LED 404 within the sequence. The exposure 409 can be used to get additional data. For example, the exposure 409 can be used to get data on background lighting. This can be useful in situations where other regions of light may be of interest. The images captured without illumination from the blue LED 401 or the red LED 404 can be used in other processes. For example, the exposure 409 can be used to get readings on water condition. The pattern of blue LED exposure 407, red LED exposure 408 followed by non-LED exposure 409 can be used repeatedly in the exposure pattern 400.

While the camera is not exposing, the LEDs 401 and 404 can alternate. This alternating can be advantageous as it can help maintain a more steady illumination level. At a rate of around 80 to 120 Hz, the alternating LEDs 401 and 404 may appear similar to steady non-flashing lights when perceived by an eye of a human or a fish. Advantageous implementations may include maintaining a higher alternating rate for the light source as steady non-flashing lights are more attractive to some fish than flashing lights.

The exposure pattern 400 can continue for as long as is required. In some implementations, the exposures will end after a subject has left the field of view of camera 406. Multiple images can be combined or processed separately. Single images can also be processed.

The LEDs used as illuminators in the example exposure patterns 200, 300, and 400 can be replaced by non LED light sources. The LEDs need not be red and blue wavelength but can be of any wavelength. Advantageous implementation can include using red and blue LEDs with wavelength ranges of between 440 nm and 485 nm for blue and 620 nm and 750 nm for red.

In experiments, capturing a few images of lice on salmon, analysis was performed with frequency ranging from violet (400 nm wavelength) to near-infrared (1000 nm wavelength). A classifier, with a regularized parameter across which frequency bins were used as an input, was trained and chose to use the shortest and longest wavelengths. Other combinations of various greens and blues (which matched the LEDs capable of functioning within the lighting apparatus) were used but the performance of the red and blue LED combination was superior. Additional subjective tests comparing various lighting schemes reached the same conclusion.

The rate at which the LEDs alternate can be fast enough to make the alternating LEDs appear as steady, non-flashing lights, when perceived by an eye of a human or a fish. For example, the LEDs can alternate at a frequency of 80 to 120 Hz. A high alternating rate is advantageous as it allows the flashing to be less noticeable by the fish being illuminated as well as reducing the time, and thus the visual differences, between consecutive snapshots of the fish when exposure patterns are used. Reducing visual differences can help reduce complexity and improve the resulting accuracy of any later image combination.

Specific orders have been shown for the exposure patterns 200, 300, and 400. The sequence of exposure patterns 200, 300, and 400 can be swapped without departing from the ideas therein. For example, in FIG. 4, the first exposure can be with the red LED 404 illuminating while the second can be an exposure with no illumination.

Figure 5:
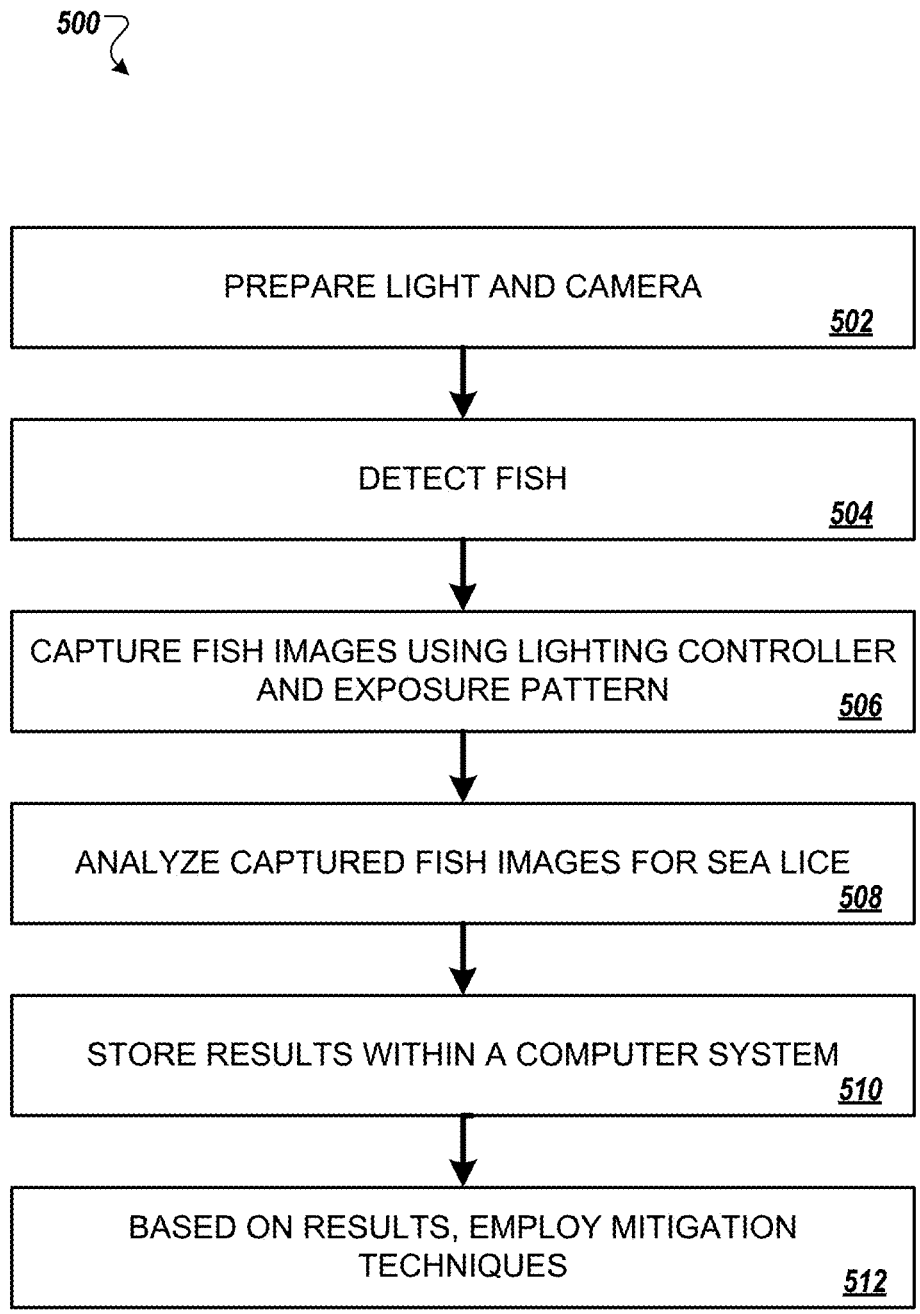
FIG. 5 is a flow diagram illustrating an example of a process for sea lice detection using a lighting controller.

FIG. 5 shows a process 500 for sea lice detection using a lighting controller.

The process 500 includes preparing an illumination system and a camera system (502). For example, control unit 120 from FIG. 1 can select the wavelength used for illuminating the fish 109.

The process 500 includes detecting fish motion within the field of view of the camera system (504). For example, as the fish 109 swims within the field of view of the camera 105, the illuminators 102, 104, 106, or 107 and the camera 105 can coordinate through signals sent from control unit 120 in a manner similar to those discussed in FIG. 2, FIG. 3, or FIG. 4.

The process 500 includes using a lighting controller exposure pattern, involving the illumination system and the camera, to capture fish images (506). For example, a specific exposure pattern similar to pattern 200 of FIG. 2 can be used with the blue LED 201 and red LED 204 functioning as the illumination system and the camera 206 functioning as the camera.

The process 500 includes analyzing captured fish images for sea lice (508). For example, the control unit can gather image 110 and image 115 and perform image analysis to detect sea lice 111.

The process 500 includes storing results within a computer system (510). For example, control unit 120 can store the results of the image analysis involving image 110 and image 115.

The process 500 includes employing mitigation techniques based on results (512). The mitigation techniques can include targeted treatments which can be comprised of lasers, fluids, or mechanical devices such as a brush or suction. For example, the control unit 120 can activate lasers to focus intense light on a fish to remove sea lice from the fish. The lasers can use sea lice location data gleaned from the image analysis performed. The control unit 120 can also delegate the mitigation to other systems or devices (e.g., other computer systems, humans).

In some implementations more or less than two lights can be used for illuminating the subject. For example, instead of the blue LED 102 and the red LED 104, another LED of a different frequency or color can be added. The illumination of any additional LED can be captured by a camera as images like the images 110 and 115.

In some implementations, more than one camera can be used. For example, instead of the camera 105 capturing images, an additional camera can be used to capture images. In some implementations, an additional camera can capture alternate angles of a subject. For example, an additional camera within the fish pen 101 can capture one side of fish 109 while the camera 105 captures the other.

In some implementations, the illumination from illuminators can be of any frequency. For example, instead of the blue and red LED lights used by illuminator 102 and illuminator 104 respectively, infrared and ultraviolet light can be used. The cameras used to capture images of scenes illuminated by illuminators can have the ability to capture the specific frequency of the illuminator. For example, if an illuminator is illuminating ultraviolet light on the subject, a camera can have the ability to sense and record the ultraviolet light within an image. Any frequency can be used within an exposure pattern like those in FIG. 2, FIG. 3, and FIG. 4.

In some implementations, more than one fish can be processed within a system like system 100. For example, the pen 101 in FIG. 1 can show not only the fish 109 but an additional fish. The additional fish can be captured by the camera 105. Both the fish 109 and the additional fish can be processed by control unit 120 and be data representing their respective detection results can be contained within the resulting detection output 121. Any number of fish can be processed in this way. Possible limitations to the number of fish processed can exist in hardware or software used.

In some implementations, more than one exposure pattern can be used. For example, both pattern 200 from FIG. 2 and pattern 300 from FIG. 3 can be used. Combinations of patterns can bring alterations to a given pattern and may result in a new pattern which can be used by a device. In some implementations, patterns can be used based on external or internal stimuli. In some situations, it may be beneficial or desirable to choose one exposure pattern over another or a specific combination of one or more exposure patterns.

In some implementations, the exposure patterns may contain an additional light or additional lights. The exposure pattern 200, 300, and 400 can be modified with the addition of a light. In some implementations, more than one light can be added. For example, in exposure pattern 200, an additional light can fire between the illumination 202 and the illumination 205. The additional light can illuminate a given subject in a separate or similar frequency to the frequencies illuminated by illuminator 201 or illuminator 204. For example, the additional light can illuminate in ultraviolet. An exposure pattern can be altered. For example, the illumination of the ultraviolet light source can be captured by an exposure after the exposure 207.

In some implementations, the exposure patterns may contain an additional camera or additional cameras. The exposure pattern 200, 300, and 400 can be modified with the addition of a camera. In some implementations, more than one camera can be added. For example, in exposure pattern 200, an additional camera can be used to capture exposures after exposure 207. The additional camera can capture an exposure of a given subject in a separate or similar frequency to the frequencies illuminated by illuminator 201 or illuminator 204. For example, the additional camera can capture exposures of light in the ultraviolet spectrum. An exposure pattern can be altered. For example, an exposure capturing ultraviolet light can be added to the exposure pattern 200 after the exposure 207.

The sea lice on a fish can be detected anywhere within a field of view of a camera. For example, the sea lice detected on a fish can be on any part of the body. The part of body, location, or number can be included within the detection output 121.

In some implementations, a system can alter detection techniques based on detection circumstances. For example, in the case of various fish species, the detection method can be altered to use algorithms associated with the species or other types of frequency of illuminator light. Furthermore, water quality can be a circumstance of detection that could be registered by the system and alter following sea lice detections. For example, if the water is murky, an increase in the brightness or quantity of lights used can be instigated and carried out by the system. Adjusting the lighting based on fish environment conditions can be a part of the illuminator controller or a separate subsystem depending on implementation. Detection techniques can also be altered by the detection of a species of fish. For example, different species could be considered a detection circumstance and registered by the system. The registering of different species could invoke different forms of detection methods.

Any alteration in sea lice detection method can result in alterations of sea lice detection output and results. For example, if a sea lice detection method was altered based on the sighting of a particular species of salmon, the output can be altered to save the sea lice detection data with species-specific feature recognition. The output can also be altered to include mitigation techniques tailored to the particular species of salmon.

In some implementations, more than two modes of light can be used in an exposure pattern. For example, instead of blue and red light, an exposure pattern can use a blue light, a red light, and a yellow light.

In some implementations, other ranges of light can be used to illuminate the subject for image capture. For example, instead of visible light, a system can use ultraviolet light.

The process 500 can also be useful in detecting other conditions. For example, skin lesions on a fish can be detected using similar methods and processes. In some implementations, instead, or in addition to, analyzing images illuminated by different frequencies of light for elements denoting sea lice infection, a system can perform other analysis. For example, a system can analyze images illuminated by different frequencies of light for elements denoting skin lesions or physical deformities such as shortened operculum.

In some implementations, a lighting controller can use a blue illuminator composed of light with multiple wavelengths. For example, a graph of output power versus wavelength for blue light can resemble a gaussian shape with peak power at 465 nm wavelength and 10% power at 450 nm and 495 nm wavelengths. Other implementations could have different proportions of wavelengths or different ranges of wavelengths. For example, a graph of output power versus wavelength for blue light can resemble a gaussian shape with peak power at 460 nm and 0% power at 455 nm and 485 nm wavelengths.

In some implementations, a lighting controller can use a red illuminator composed of light with multiple wavelengths. For example, a graph of output power versus wavelength for red light can resemble a gaussian shape with peak power at 630 nm wavelength and 10% power at 605 nm and 645 nm. Other implementations could have different proportions of wavelengths or different ranges of wavelengths. For example, a graph of output power versus wavelength for red light can resemble a gaussian shape with peak power at 635 nm and 0% power at 610 nm and 640 nm wavelengths.

Figure 6A:
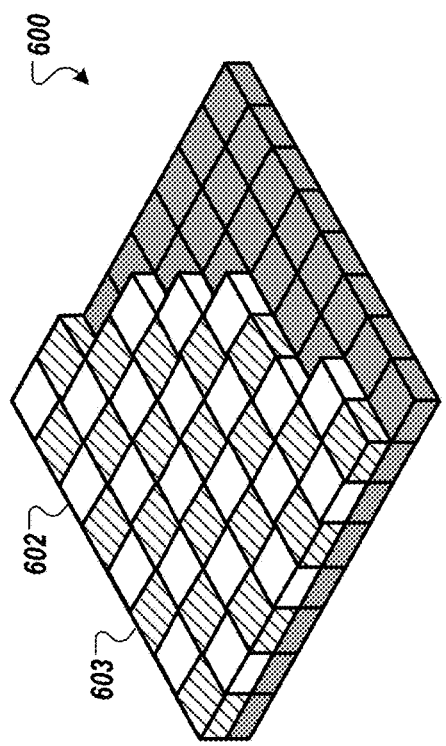
FIGS. 6A, 6B, and 6C are diagrams of custom Bayer filters.
Figure 6C:
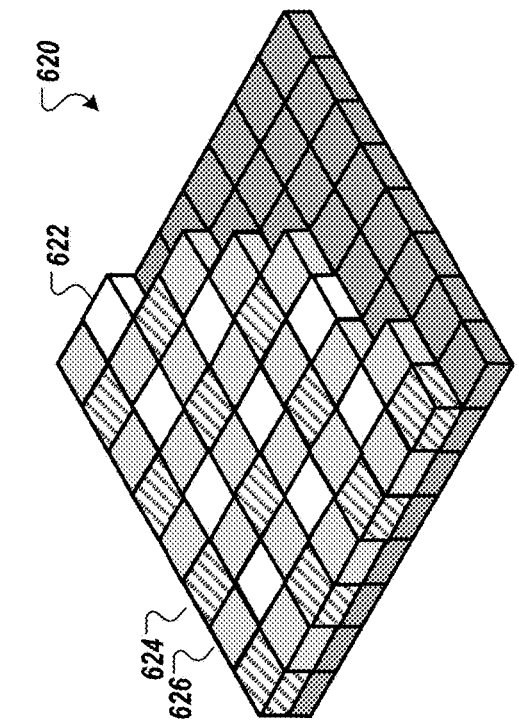
Figure 6B:
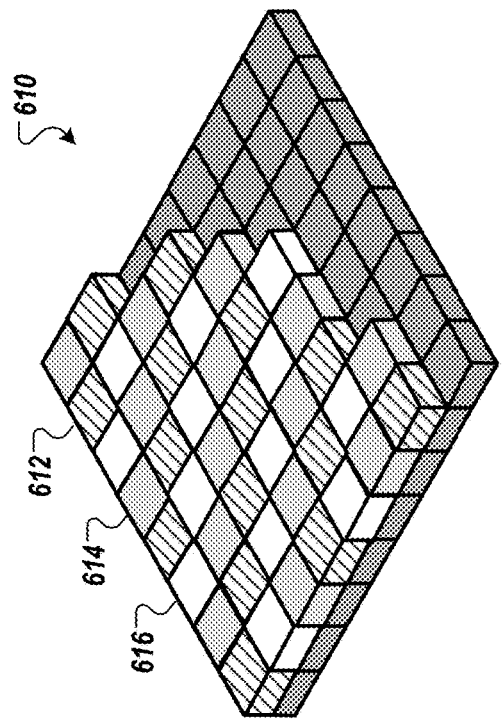

FIGS. 6A, 6B, and 6C are diagrams of custom Bayer filters for use within sea lice detection.

FIG. 6A includes two different color filters on the pixel array 600. The pixel array 600 can be used in fish imaging. Pixel 602 corresponds with the color filter red. Pixel 603 corresponds with the color filter blue. Pixel array 600 is partially filled for illustration purposes. Matching pattern and shading on two or more pixels of the array 600 denotes pixels of the same filter type. By adjusting a normal Bayer filter, the pixel array 600 can increase a camera's light sensitivity for key frequencies. In some implementations of sea lice detection, these key frequencies are red light (e.g., 625 nm to 780 nm wavelength) and blue light (e.g., 450 nm to 485 nm wavelength). The color filters on the pixel array 600 correspond to these frequencies. In the arrangement shown in pixel array 600, the amount of light captured in both the red and blue spectrum is effectively doubled compared with a normal red, green and blue pixel array used in some standard cameras.

In some implementations, the additional light sensitivity can reduce the number of images that need to be captured for sea lice detection. For example, a scene could be illuminated with both blue and red LEDs simultaneously. A camera could then capture an image. In some implementations, separate images could be extracted from the red and blue components of a single image.

In some implementations, the color arrangement can be swapped. For example, blue pixels can take the place or red pixels and vice versa.

In some implementations, color filters able to transmit different ranges of wavelengths can be used. For example, the pixels able to register blue light like item 603 in pixel array 600 could be swapped with pixels able to register ultraviolet light.

FIG. 6B is another custom Bayer filter which includes three different color filters on the pixel array 610. Pixel 612 corresponds with the color filter blue. Pixel 614 corresponds to a blank color filter which allows all wavelengths to register evenly. Pixel 616 corresponds with the color filter red. Pixel array 610 is partially filled for illustration purposes. Matching pattern and shading on two or more pixels of the array 610 denotes filters of the same type. By adjusting a normal Bayer filter, the pixel array 610 allots equal amount of pixels for each channel (e.g., red filter channel, blue filter channel, blank filter channel). The structure is uniform and can potentially be more easily interpreted by neural networks working with output images. The color filters can accept light with wavelength within a particular range (e.g., 625 nm to 780 nm for the red filter 616, 450 nm to 485 nm for the blue filter 612, and the full visible spectrum for the blank filter 614). In some implementations, the color arrangement can be flipped.

In some implementations, the additional light sensitivity can reduce the number of images that need to be captured for sea lice detection. For example, a scene could be illuminated with both blue and red LEDs simultaneously. A camera could then capture a single image and from that image, separate images could be extracted for both the red and blue components.

In some implementations, the color arrangement can be flipped. For example, blue pixels can take the place or red pixels and vice versa.

In some implementations, color filters able to transmit different ranges of wavelengths can be used. For example, the pixels able to register blue light like item 612 in pixel array 610 could be swapped with pixels able to register ultraviolet light.

FIG. 6C is another custom Bayer filter which includes three different color filters on the pixel array 620. Pixel 622 corresponds with the color filter red. In this implementation, the red color filter of pixel 622 allows light to pass through if the wavelength of the light is within the range 625 nm to 780 nm. Pixel 624 corresponds with the color filter blue, in this implementation allowing light through with wavelength within the range 450 nm to 485 nm. Pixel 626 corresponds to a blank color filter which allows, in this implementation, all wavelengths to register evenly. Pixel array 610 is partially filled for illustration purposes.

Matching pattern and shading on two or more pixels of the array 620 denotes filters of the same type. By adjusting a normal Bayer filter, the pixel array 620 creates smaller two by two windows (i.e. a group of four mutually connected pixels forming a square) made up of the specific filter channels used (e.g., red filter channel, blue filter channel, blank filter channel). This type of structure has the advantage of granularity as well as applications for other fish related identification work. For example, for applications in which images are needed in more light wavelengths than just red and blue, the blank filter data can be used. In this way, the pixel array 620 is well suited for full spectrum photography as well as sea lice detection specific photography concentrated within the wavelengths specified of red and blue. In some implementations, the color arrangement can be flipped while maintaining the general pattern.

In some implementations, the additional light sensitivity can reduce the number of images that need to be captured for sea lice detection. For example, a scene could be illuminated with both blue and red LEDs simultaneously. A camera could then capture an image. In some implementations, separate images could be extracted from the red and blue components of a single image.

In some implementations, the arrangement of pixels can be changed while preserving the overall pattern. For example, the locations of red pixels similar to red pixel 622 and blue pixels similar to blue pixel 624 can be switched while preserving the overall pattern and benefits of the cell array 620 as shown.

In some implementations, color filters able to transmit different ranges of wavelengths can be used. For example, the pixels able to register blue light like item 624 in pixel array 620 could be swapped with pixels able to register ultraviolet light.

Figure 7:
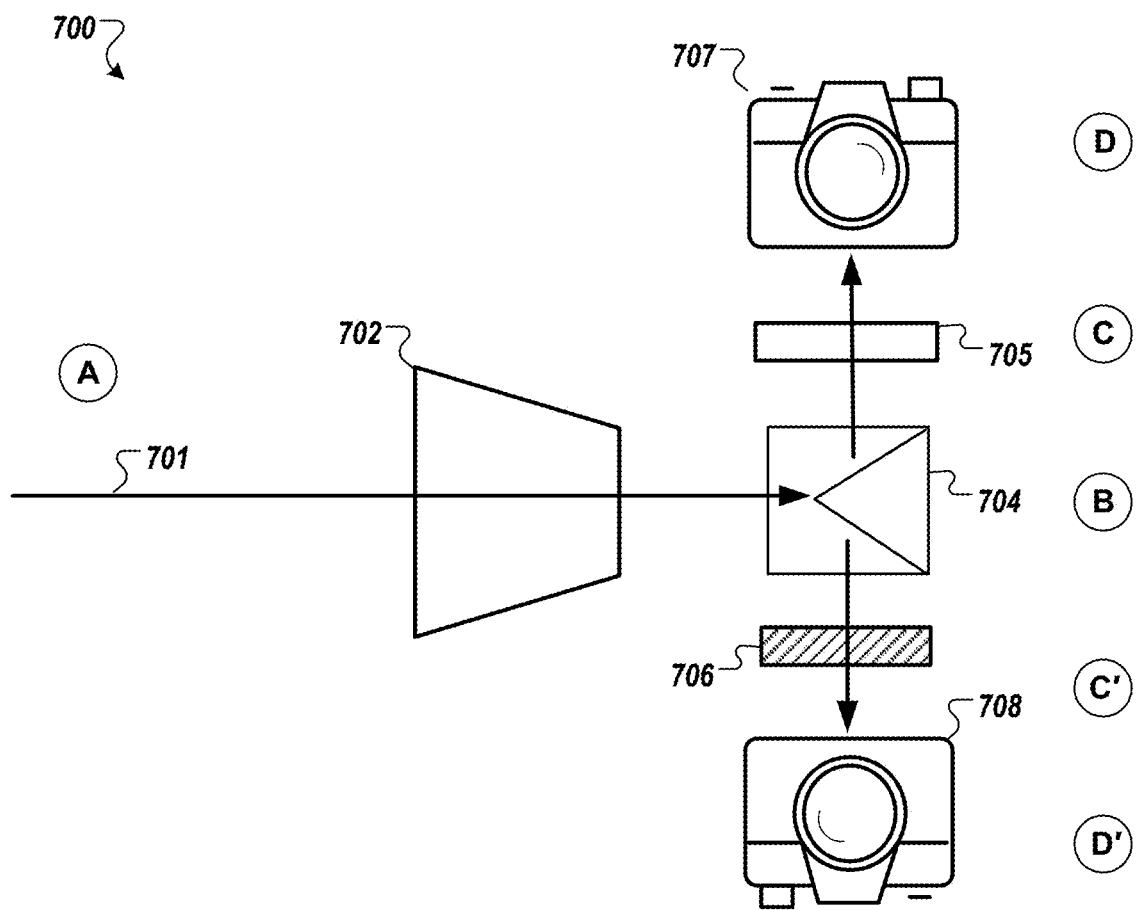
FIG. 7 is a diagram of a method for image collection using a beam splitter.

FIG. 7 is a diagram which shows a system 700 comprised of an incident light beam 701, a primary lens 702, a beam splitter 704, a red filter 705, a blue filter 706, a camera 707, and another camera 708. The system 700 can be used for image collection.

The incident light beam 701 can be the light from an exposure of a fish within a pen. The primary lens 702 can be made out of glass and can help direct the light towards the beam splitter 704. In some implementations, additional lenses or mirrors can be used for focusing the incident beam.

The beam splitter 704 is constructed such that a portion of the incident beam 701 is reflected and a portion of the incident beam 701 is transmitted creating two beams of light from the incident beam 701. Additional optical elements not shown can be used within the beam splitter 704 and other devices within the system 700. For example, within the beam splitter 704 can be multiple lenses and mirrors as well as gluing and connecting agents.

The red filter 705 and the blue filter 706 can be tuned to allow specific frequency light through. For example, the red filter 705 can be tuned to allow only light with wavelength between 620 nm and 750 nm. The blue filter 706 can be tuned to allow only light with wavelength between 440 nm and 485 nm.

The camera 707 and the camera 708 can capture a light beam using a light detector. The light detector captures incoming light and creates an image. For example, the light detector can encode the captured light as a list of pixels with color and intensity. The pixel information can be stored as an image and can be used by other devices and systems.

Stage A of FIG. 7 shows the incident beam 701 moving to the lens 702. The incident beam 701 can be the light from an exposure of a scene. For example, the incident beam can be comprised of the light reflected off a fish swimming in a pen.

Stage B of FIG. 7 shows the incident beam 701 split by the beam splitter 704. The beam splitter 704 can have multiple lenses and mirrors used to direct the two outbound light beams.

Stage C of FIG. 7 shows the output of the beam splitter 704 passing through the red filter 705. The light before the red filter 705 can be any wavelength reflected or transmitted from the beam splitter 704. The light after the red filter 705 can be any wavelength within the range of the filter (e.g., 620 nm and 750 nm).

Stage C' of FIG. 7 shows the output of the beam splitter 704 passing through the blue filter 706. The beam passing through the red filter 705 and the blue filter 706 can be separate such that light passing through the red filter 705 does not also pass through the blue filter 706. The light before the blue filter 706 can be any wavelength reflected or transmitted from the beam splitter 704. The light after the blue filter 706 can be any wavelength within the range of the filter (e.g., 440 nm and 485 nm).

Stage D of FIG. 7 shows the output of the red filter 705 reaching the camera 707. The camera 707 can use a light detector to capture the incoming light from the red filter 705 and create an image. This image can be a stored group of pixels with colors and intensities. Images captured by the camera 707 can be used for sea lice detection.

Stage D' of FIG. 7 shows the output of the blue filter 706 reaching the camera 708. The camera 708 can use a light detector to capture the incoming light from the blue filter 706 and create an image. This image can be a stored group of pixels with colors and intensities. Images captured by the camera 708 can be used for sea lice detection.

Possible advantages of the system 700 is that it preserves the spatial resolution of each channel. It is also easier to construct color filters (e.g., red filter 705, blue filter 706) than the devices in some other image collection methods (e.g., custom image chips requiring per pixel accuracy). Simple colored optical filters can be manufactured. Some potential drawbacks include the cost of the beam splitter 704 and the fact that after splitting, the light captured by camera 707 and camera 708 will be less intense than the incident beam 701. This can be alleviated with a greater intensity light on the subject of the image but greater intensity light can affect the subject's behavior. For example, a more intense light may scare fish away from the field of view captured by the incident beam 701. This could result in fewer opportunities to collect images of fish.

Figure 8:
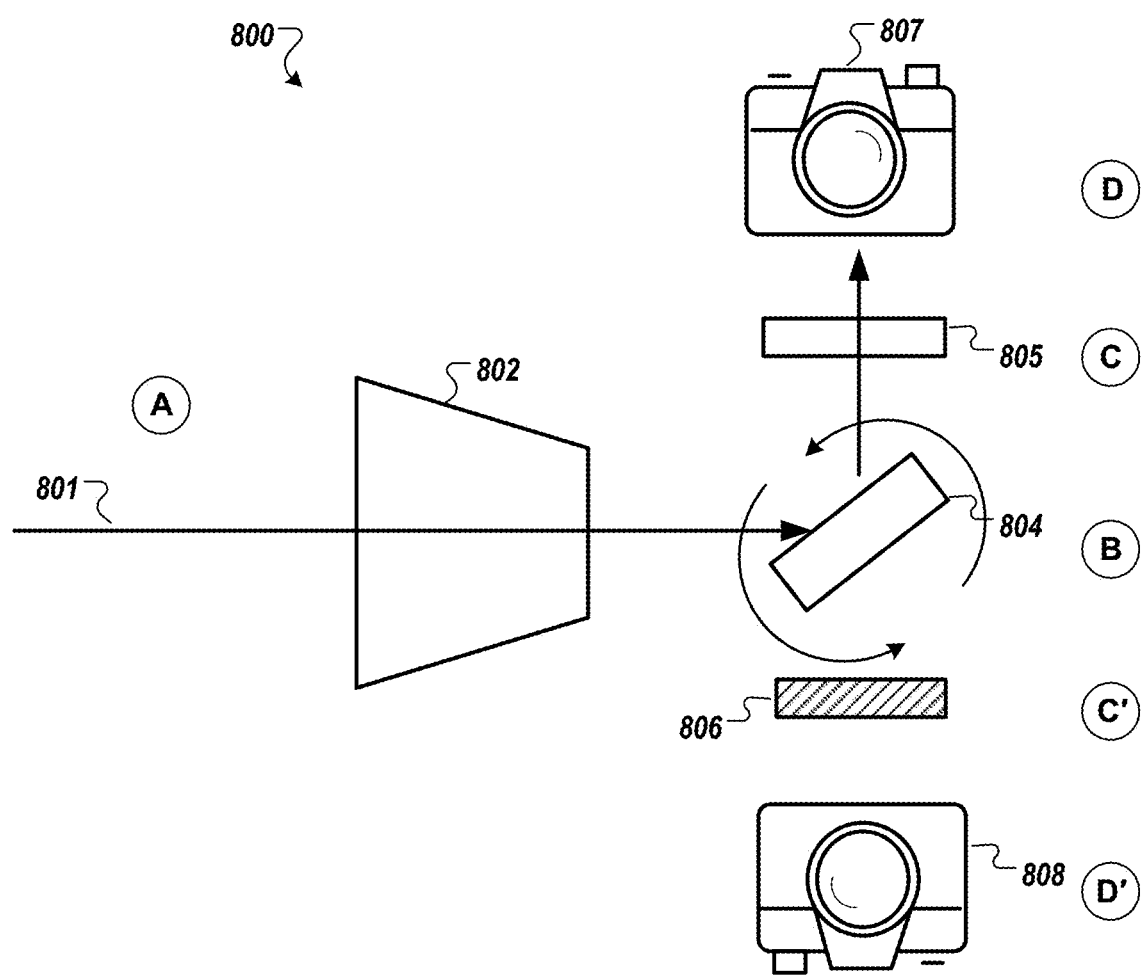
FIG. 8 is a diagram of a method for image collection using a rotating mirror.

FIG. 8 is a diagram which shows the system 800 comprised of an incident beam 801, a primary lens 802, a spinning mirror 804, a red filter 805, a blue filter 806, a camera 807, and another camera 808. The system 800 can be used for image collection. In some implementations, images collected can be used in the process of detecting sea lice.

The incident light beam 801 can be the light from an exposure of a fish within a pen. The primary lens 802 can be made out of glass and can help direct the light towards the spinning mirror 804. In some implementations, additional lenses or mirrors can be used for focusing the incident beam.

The spinning mirror 804 is constructed such that the incident beam 801 is reflected at an angle. Two angles vital to the system 800 is the angle which reflects the incident beam 801 towards the red filter 805 and camera 807 and the angle which reflects the incident beam 801 towards the blue filter 806 and the camera 808. These two angles can be separate portions of a rotation of the spinning mirror 804.

Additional optical elements not shown can be used within the spinning mirror 804 and other devices within the system 800. For example, before or after the spinning mirror 704 can be multiple lenses and mirrors as well as gluing and connecting agents.

The red filter 805 and the blue filter 806 can be tuned to allow specific frequency light through. For example, the red filter 805 can be tuned to allow only light with wavelength between 620 nm and 750 nm. The blue filter 806 can be tuned to allow only light with wavelength between 440 nm and 485 nm.

The camera 807 and the camera 808 can capture a light beam using a light detector. The light detector captures incoming light and creates an image. For example, the light detector can encode the captured light as a list of pixels with color and intensity. The pixel information can be stored as an image and can be used by other devices and systems.

Stage A of FIG. 8 shows the incident beam 801 moving to the lens 802. The incident beam 801 can be the light from an exposure of a scene. For example, the incident beam can be comprised of the light reflected off a fish swimming in a pen.

Stage B of FIG. 8 shows the incident beam 801 reflected by the spinning mirror 804. The spinning mirror 804 can have multiple lenses and mirrors used to accept and direct the outbound light beam.

Stage C of FIG. 8 shows the output of the spinning mirror 804 passing through the red filter 805. The light before the red filter 805 can be any wavelength reflected by the spinning mirror 804. The light after the red filter 805 can be any wavelength within the range of the filter (e.g., 620 nm and 750 nm).

Stage C' of FIG. 8 shows the blue filter 805. During the course of a rotation for the spinning mirror 804, the output of the spinning mirror 804 can be directed towards the blue filter 806. The directed light can pass through the blue filter 806. The light before the blue filter 806 can be any wavelength reflected or transmitted from the mirror 804. The light after the blue filter 806 can be any wavelength within the range of the filter (e.g., 440 nm and 485 nm). The cases of output from the spinning mirror 804 can be separate such that light passing through the red filter 805 does not also pass through blue filter 806.

Stage D of FIG. 8 shows the output of the red filter 805 reaching the camera 807. The camera 807 can use a light detector to capture the incoming light from the red filter 805 and create an image. This image can be a stored group of pixels with colors and intensities. Images captured by the camera 807 can be used for sea lice detection.

Stage D' of FIG. 8 shows the camera 808. During the course of a rotation for the spinning mirror 804, the output of the spinning mirror 804 can be directed towards the blue filter 806. The output of the blue filter 806 can be directed towards the camera 808. The camera 808 can use a light detector to capture the incoming light from the blue filter 806 and create an image. This image can be a stored group of pixels with colors and intensities. Images captured by the camera 808 can be used for sea lice detection.

The spinning mirror 804 can rotate at high speed and direct the portion of the incident beam 801 reflected from the spinning mirror 804 into a camera (e.g., the camera 807, the camera 808). The process of rotating the spinning mirror 804 between directing light towards the camera 807 or the camera 808 can introduce a slight delay between the two cameras as they take their images. The motion of rotation can also affect the period of exposure for camera 807 or camera 808. In some implementations, the mirror can snap between locations which could allow for longer imaging without warping due to the moving of the image.

Figure 9:
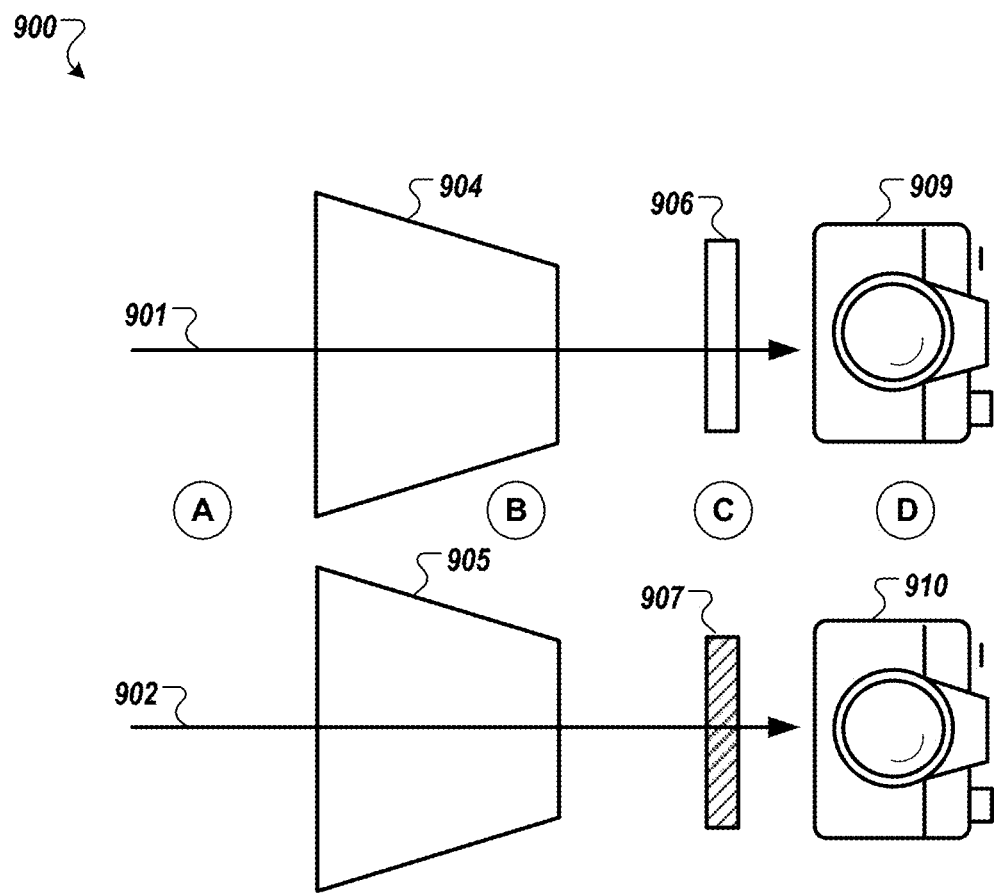
FIG. 9 is a diagram of a method for image collection using a pair of stereo cameras.

FIG. 9 is a diagram which shows the system 900 for stereo camera image capture. The system 900 is comprised of an incident beam 901, an incident beam 902, a primary lens 904, a primary lens 905, a red filter 906, a blue filter 907, a camera 909, and another camera 910. In some implementations, the camera 909 and the camera 910 can be connected to form a stereo camera system. The system 900 can be used for image collection. In some implementations, images collected can be used in the process of detecting sea lice.

The incident light beams 901 and 902 can be the light from an exposure of a fish within a pen. The primary lenses 904 and 905 can be made out of glass and can help direct the light towards the red filter 906 or the blue filter 907. In some implementations, additional lenses or mirrors can be used for focusing the incident beam.

The red filter 906 and the blue filter 907 can be tuned to allow specific frequency light through. For example, the red filter 906 can be tuned to allow only light with wavelength between 620 nm and 750 nm. The blue filter 907 can be tuned to allow only light with wavelength between 440 nm and 485 nm.

The camera 909 and the camera 910 can capture a light beam using a light detector. The light detector captures incoming light and creates an image. For example, the light detector can encode the captured light as a list of pixels with color and intensity. The pixel information can be stored as an image and can be used by other devices and systems.

Stage A of FIG. 9 shows the incident beams 901 and 902 moving towards the lenses 904 and 905 respectively. The incident beams 901 and 902 can be light from simultaneous exposures of a scene. For example, the incident beams 901 and 902 can be comprised of the light reflected off a fish swimming in a pen.

Stage B of FIG. 9 shows the incident beams 901 and 902 focused by lenses 904 and 905 respectively. The light output from lens 904 and lens 905 can be sent towards the red filter 906 and the blue filter 907. The process of directing light towards the filters can be comprised of multiple lenses and mirrors.

Stage C of FIG. 9 shows the output of the lenses 904 and 905 passing through the red filter 906 and the blue filter 907 respectively. The light directed towards the red filter 906 can be any wavelength transmitted by the lens 904 or other optical element. The light after the red filter 906 can be any wavelength within the range of the filter (e.g., 620 nm and 750 nm). The light directed towards the blue filter 907 can be any wavelength transmitted by the lens 905 or other optical element. The light transmitted through the blue filter 906 can be any wavelength within the range of the filter (e.g., 440 nm and 485 nm).

Stage D of FIG. 9 shows the output of the red filter 906 reaching the camera 909. The output of the blue filter 907 can be directed towards the camera 910. The cameras 909 or 910 can use a light detector to capture the incoming light from the filter (e.g., the red filter 906, the blue filter 907) to create an image. This image can be a stored group of pixels with colors and intensities. Images captured by the camera 909 and the camera 910 can be used for sea lice detection.

The system 900, by employing stereo cameras each with a different color filter in front, allows the cameras to take pictures simultaneously with no reduction in incident light besides the losses in various optical elements including the filters. This represents a possible advantage over other image capture techniques. A possible disadvantage of the stereo camera setup can include the introduction of parallax between the two images. For example, a pixel at coordinate (x, y) in an image captured by camera 909 will not be the same as a pixel at coordinate (x, y) in an image captured by camera 910. The introduction of parallax between two images can potentially complicate a multi-frame registration process.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A computer-implemented method comprising:
illuminating a particular fish with pairs of discrete light pulses that are separated by time and that each include a pulse of red light and a pulse of blue light;
controlling an exposure of a camera to (i) generate a first image of the particular fish during a pulse of one of the red light or the blue light during an initial pair of the light pulses, (ii) not generate an image during a pulse an other of the red light or the blue light during the initial pair of the light pulses as well as during one or more succeeding pairs of the light pulses, and (iii) generate a second image of the particular fish during a pulse of the other of the red light or the blue light during a subsequent pair of the light pulses; and
determining whether the particular fish is likely affected by a particular condition based on an analysis of at least the first image and the second image.

2. The computer-implemented method of claim 1, wherein the particular condition comprises a sea lice infection, an occurrence of a lesion, or a physical deformity.

3. The computer-implemented method of claim 1, wherein the particular fish is contained within a fish pen or a fish run.

4. The computer-implemented method of claim 1, wherein the pairs of the light pulses each comprise the pulse of blue light with peak power within a wavelength range of 450 nanometers to 480 nanometers.

5. The computer-implemented method of claim 1, wherein the pairs of the light pulses feature an alternating rate of greater than 60 Hz.

6. The computer-implemented method of claim 1, wherein generating each image comprises:
exposing a camera device for at least a portion of a time interval between a start of a particular light pulse and an end of the particular light pulse to capture exposure data; or
exposing a camera device for at least a portion of a time interval between the end of the particular light pulse and a start of a succeeding light pulse to capture exposure data.

7. The computer-implemented method of claim 1, wherein the light pulses within each pair of the light pulses are activated in discrete time intervals and do not overlap.

8. The computer-implemented method of claim 1, wherein machine learning informs illuminating the particular fish or generating the images of the particular.

9. The computer-implemented method of claim 1, wherein machine learning informs sea lice detection on the particular fish.

10. The computer-implemented method of claim 1, comprising storing the generated images in an image buffer.

11. A computer-implemented method comprising:
illuminating a particular fish with pairs of discrete light pulses that are separated by time and that each include a pulse of red light and a pulse of blue light;
controlling an exposure of a camera to (i) generate a first image of the particular fish during a pulse of one of the red light or the blue light during an initial pair of the light pulses, (ii) generate a second image of the particular fish during a pulse of an other of the red light or the blue color of light during the initial pair of the light pulses, (iii) and not generate an image during one or more succeeding pairs of the light pulses; and
determining whether the particular fish is likely affected by a particular condition based on an analysis of at least the first image and the second image.

12. The computer-implemented method of claim 11, wherein the particular condition comprises a sea lice infection, an occurrence of a lesion, or a physical deformity.

13. The computer-implemented method of claim 11, wherein the pairs of the light pulses each comprise the pulse of blue light with peak power within a wavelength range of 450 nanometers to 480 nanometers.

14. The computer-implemented method of claim 11, wherein the pairs of the light pulses feature an alternating rate of greater than 60 Hz.

15. The computer-implemented method of claim 11, wherein generating each image comprises:
exposing a camera device for at least a portion of a time interval between a start of a particular light pulse and an end of the particular light pulse to capture exposure data; or
exposing a camera device for at least a portion of a time interval between the end of the particular light pulse and a start of a succeeding light pulse to capture exposure data.

16. A computer-implemented method comprising:
illuminating a particular fish with pairs of discrete light pulses that are separated by time and that each include a pulse of red light and a pulse of blue light;
controlling an exposure of a camera to (i) generate a first image of the particular fish during a pulse of one of the red light or the blue light during an initial pair of the light pulses, (ii) not generate an image during a pulse of an other of the red light or the blue light during the initial pair of the light pulses as well as during a pulse of the one of the red light or the blue light during a succeeding pair of the light pulses, (iii) generate a second image of the particular fish during a pulse of the other of the red light or the blue light during the succeeding pair of the light pulses, (iv) not generate an image during a pulse of the one of the red light or the blue light during a subsequent pair of the light pulses as well as during a pulse of the other of the red light or the blue light during the subsequent pair of the light pulses, and (v) generate a third image of the particular fish after the subsequent pair of the light pulses but before a further pair of the light pulses; and determining whether the particular fish is likely affected by a particular condition based on an analysis of at least the first image and the second image.

17. The computer-implemented method of claim 16, wherein the particular condition comprises a sea lice infection, an occurrence of a lesion, or a physical deformity.

18. The computer-implemented method of claim 16, wherein the pairs of the light pulses each comprise the pulse of blue light with peak power within a wavelength range of 450 nanometers to 480 nanometers.

19. The computer-implemented method of claim 16, wherein the pairs of the light pulses feature an alternating rate of greater than 60 Hz.

20. The computer-implemented method of claim 16, wherein generating each image comprises:

exposing a camera device for at least a portion of a time interval between a start of a particular light pulse and an end of the particular light pulse to capture exposure data; or exposing a camera device for at least a portion of a time interval between the end of the particular light pulse and a start of a succeeding light pulse to capture exposure data.

* * * * *

UNITED STATES PATENT AND TRADEMARK OFFICE
CERTIFICATE OF CORRECTION

| | | |
|---|---|---|
| PATENT NO. | : 11,297,806 B2 | Page 1 of 1 |
| APPLICATION NO. | : 16/743023 | |
| DATED | : April 12, 2022 | |
| INVENTOR(S) | : Messana et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 64 days.

Signed and Sealed this
Eighteenth Day of February, 2025

Coke Morgan Stewart
*Acting Director of the United States Patent and Trademark Office*